Aug. 24, 1948.  B. L. HURST  2,447,910
LANDING POSITION INDICATOR FOR AIRCRAFT
Filed March 20, 1946
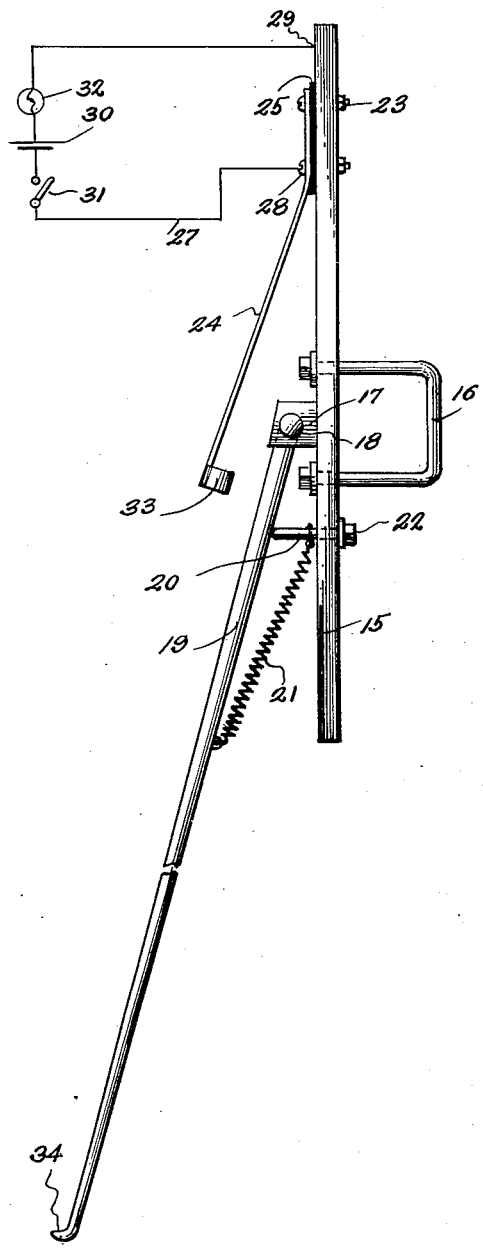
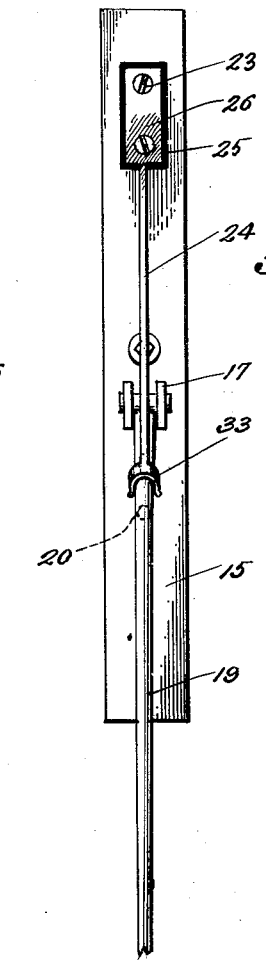
Inventor
BASIL L. HURST
By Randolph & Beavers
Attorneys Patented Aug. 24, 1948

2,447,910

UNITED STATES PATENT OFFICE 2,447,910

LANDING POSITION INDICATOR FOR AIRCRAFT

Basil L. Hurst, Clarendon, Tex.

Application March 20, 1946, Serial No. 655,687

1 Claim. (Cl. 200—52)

This invention relates to a device for aiding a pilot in making a safe landing with an aircraft and consists of a device to indicate to the pilot the altitude of his aircraft just prior to landing, in order to prevent levelling off too high, causing a pancake landing, or levelling off too low, causing ballooning. This device will also aid materially in night landing or in instrument landing.

One of the main objects of the invention is to provide means which, upon making contact with the ground, will indicate the change of the position of the landing gear.

One embodiment of the device is shown in the attached drawing, wherein like numerals refer to the same parts in the different views:

Figure 1 is a side elevation of the position indicator, and

Figure 2 a rear elevation of Figure 1.

In the drawing, reference numeral 15 indicates a metal bracket firmly secured by a U-bolt or clip 16 in any suitable vertical position on the fuselage, adjacent the landing gear proper. As here shown, the bracket 15 consists of a flat, narrow board or plate and, about midway between its ends, is provided a cradle 17 with a pivot pin 18 upon which is hung, for swinging in a vertical plane, a flexible trailing rod 19, which is normally held against a stop 20, slightly inclined in normal or traveling position, as indicated in Figure 1 by a tension spring 21 which tends to draw the rod 19 against the stop 20. Stop 20 is adjustable by a bolt 22 up or down in the bracket 15, thereby permitting adjustment in angular position of the flexible trailing rod 19.

Near the upper end of the bracket 15 is secured by means of bolts 23, a long, narrow metal spring 24, directly above the trailing rod 19 and in the same vertical plane thereof, but without normally contacting therewith. An insulation strip 25 is inserted between the flattened upper end 26 of the spring 24 and the metal plate or bracket 15. In a circuit 27 having one end connected with the spring 24 as at 28 and its other end with the bracket 15 by contact 29, a lamp 32 will be lit on the instrument panel of the aircraft, the circuit also containing battery or flashlight cells 30 and a switch 31.

The position of the metal spring 24 may be adjusted up or down by screws 23, thereby increasing or decreasing the distance between the same and the trailing rod 19, being the equivalent of lengthening or shortening the rod 19.

The contact spring 24 is provided with a U-shaped guide or clip 33 at its lower end, which is adapted to grip rod 19, when the latter is swung back, thus making contact and completing the circuit 27 to light the lamp 32, provided the switch 31 is closed.

In order to slide easily on the ground, the rod 19 has a hook-shaped end 34 pointing rearwardly.

Preparatory to landing, when the rod 19 of the aircraft makes contact with the ground, it will be swung upwardly and to the rear until it becomes engaged by the clip or guide 33, previous to which the switch 31 is turned on. A signal is thereby given on the instrument panel by lamp 32, which thus indicates the correct levelling-off altitude. The light will thus burn until landing is completed, when the light is extinguished upon turning off the switch 31.

It is to be understood that the invention as here disclosed is not limited to the details herein described and shown, but that the same may be varied without departing from the spirit of the invention as defined by the subjoined claim.

I claim:

A circuit closing device comprising an upright, a structure attaching clamp on the upright, a vertically movable stop on the upright having one end portion protruding beyond one side of the upright, an elongated feeler rod having its upper end pivotally secured to the upright and trailing below the lower end of the upright, a tension spring having one end secured to the stop and its other end to a medial point of the rod, an elongated spring contact arm provided with a spring contact member at one end adapted to be engaged by the rod when the rod strikes a structure at its free end and is moved toward said spring arm, said spring arm being attached to the upright and having its contact end normally spaced from the said rod.

BASIL L. HURST.

REFERENCES CITED

The following references are of record in the file of this patent:

UNITED STATES PATENTS

| Number | Name | Date |
|---|---|---|
| 2,143,997 | Parkinson | Jan. 17, 1939 |
| 2,259,614 | Chang | Oct. 21, 1941 |
| 2,279,605 | Welsh | Apr. 14, 1942 |

FOREIGN PATENTS

| Number | Country | Date |
|---|---|---|
| 24,163 | Great Britain | 1913 |
| 748,796 | France | Apr. 25, 1933 |